(12) United States Patent
Wang (10) Patent No.: US 12,363,396 B2
(45) Date of Patent: Jul. 15, 2025

(54) PROCESSING METHOD, ELECTRONIC DEVICE, AND STORAGE MEDIUM

(71) Applicant: Lenovo (Beijing) Limited, Beijing (CN)

(72) Inventor: Rui Wang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/384,290

(22) Filed: Oct. 26, 2023

(65) Prior Publication Data
US 2024/0147020 A1    May 2, 2024

(30) Foreign Application Priority Data
Nov. 1, 2022 (CN) .......................... 202211357458.3

(51) Int. Cl.
*H04N 21/647* (2011.01)
(52) U.S. Cl.
CPC .............................. *H04N 21/64784* (2013.01)

(58) Field of Classification Search
CPC ............................................... H04N 21/64784
See application file for complete search history.

(56) References Cited

U.S. PATENT DOCUMENTS

| 8,712,157 B2* | 4/2014 | Marchesotti | G06V 10/806 382/190 |
|---|---|---|---|
| 11,403,489 B2* | 8/2022 | Han | G06F 18/217 |
| 11,887,276 B2* | 1/2024 | Zu | G06T 5/73 |
| 2021/0281771 A1* | 9/2021 | Yang | G06V 10/75 |
| 2024/0127406 A1* | 4/2024 | Xiong | G06T 5/73 |

* cited by examiner

*Primary Examiner* — Nazia Naoreen
(74) *Attorney, Agent, or Firm* — ANOVA LAW GROUP, PLLC (57) ABSTRACT

A processing method includes evaluating multimedia data of a spatial environment where an electronic device is located; and determining a target processing strategy according to an evaluation result and using the target processing strategy to process the multimedia data, where strategies for evaluating the multimedia data include the target processing strategy; and in the multimedia data, a data volume used for evaluation is less than a data volume processed under the target processing strategy.

20 Claims, 5 Drawing Sheets

Evaluating multimedia data of a spatial environment where an electronic device is located — 102

Determining a target processing strategy according to an evaluation result and using the target processing strategy to process the multimedia data, where strategies for evaluating the multimedia data include the target processing strategy; and in the multimedia data, a data volume used for evaluation is less than a data volume processed under the target processing strategy — 104

PROCESSING METHOD, ELECTRONIC DEVICE, AND STORAGE MEDIUM

CROSS-REFERENCE TO RELATED APPLICATION

This application claims the priority of Chinese Patent Application No. 202211357458.3, filed on Nov. 1, 2022, the content of which is incorporated herein by reference in its entirety.

TECHNICAL FIELD

The present disclosure generally relates to the field of data processing technology, and, more particularly, relates to a processing method, an electronic device, and a storage medium.

BACKGROUND

After an audio collection module or a camera collection module collects data, a digital signal processor in the audio collection module or an image signal processor in the camera collection module directly performs a fixed type processing on all data.

SUMMARY

One aspect of the present disclosure provides a processing method. The processing method includes evaluating multimedia data of a spatial environment where an electronic device is located; and determining a target processing strategy according to an evaluation result and using the target processing strategy to process the multimedia data, where strategies for evaluating the multimedia data include the target processing strategy; and in the multimedia data, a data volume used for evaluation is less than a data volume processed under the target processing strategy.

Another aspect of the present disclosure provides an electronic device. The electronic device includes a multimedia data collector, configured to collect multimedia data in a spatial environment where an electronic device is located; a first processor, connected to an interface of the multimedia data collector and configured to evaluate the multimedia data collected by the multimedia data collector and determine a target processing strategy according to an evaluation result; and a second processor, communicatively connected to the first processor and configured to process the multimedia data in response to the target processing strategy, where strategies for evaluating the multimedia data by the first processor includes the target processing strategy, and a data volume of the multimedia data processed by the first processor is less than a data volume of the multimedia data processed by the second processor.

Another aspect of the present disclosure provides a non-transitory computer-readable storage medium, containing a computer program for, when executed by a processor, performing a processing method. The method includes evaluating multimedia data of a spatial environment where an electronic device is located; and determining a target processing strategy according to an evaluation result and using the target processing strategy to process the multimedia data, where strategies for evaluating the multimedia data include the target processing strategy; and in the multimedia data, a data volume used for evaluation is less than a data volume processed under the target processing strategy.

Other aspects of the present disclosure may be understood by those skilled in the art in light of the description, the claims, and the drawings of the present disclosure.

DETAILED DESCRIPTION

The technical solutions of the present disclosure are further described below in conjunction with accompanying drawings and embodiments.

Figure 1:
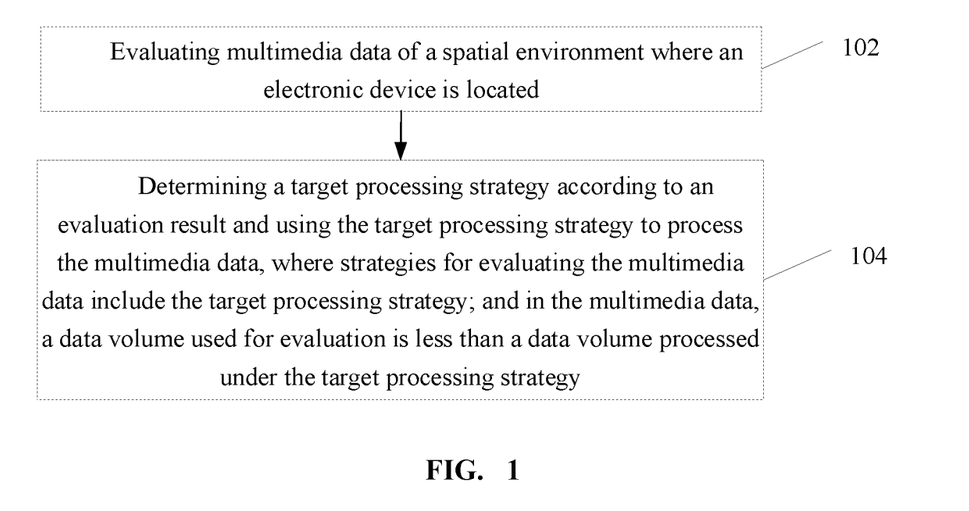
FIG. 1 illustrates a flowchart of a processing method according to various embodiments of the present disclosure.

FIG. 1 illustrates a flowchart of a processing method according to various embodiments of the present disclosure. Referring to FIG. 1, the processing method may include following exemplary steps.

At 102, collected multimedia data of a spatial environment where an electronic device is located may be evaluated.

The spatial environment may include a meeting environment, a chat environment, a working environment, an entertainment environment, a teaching environment, a driving environment and the like. The values of environmental parameters in different spatial environments may be different, and the environmental parameters may include a sound level of a noise, a brightness, a number of objects in the environment and/or the like. The multimedia data may include image data, audio data, video data and the like. The audio data may be the data from an audio collection device, for example, the data from a microphone. The image data may be data from an image collection device, such as the data from a camera.

At 104, a target processing strategy may be determined according to the evaluation result, and the target processing strategy may be used to process the multimedia data.

The strategies for evaluating the multimedia data may include the target processing strategy, and the data volume used for evaluation in the multimedia data is less than the data volume processed under the target processing strategy.

The evaluation result may characterize the quality of the multimedia data, such as the signal-to-noise ratio of the multimedia data, the strength of an effective signal, and the amount of noise in the multimedia data. The higher the evaluation result is, the less the noise content in the image data or the audio data is, and the higher the quality of the image data or audio data is. The less the noise content in the image data is, the cleaner the picture is. The data volume used for evaluation in the multimedia data may be the first data volume, and the data volume in the multimedia data processed used for the target processing strategy may be the second data volume. The first data volume may be less than the second data volume. The evaluation result may also characterize the sizes, quantities and the like of objects contained in the multimedia data. Target processing strategies may include an image processing strategy, an audio processing strategy and the like. The image processing strategies may include image digitization, image enhancement and restoration, image data encoding, image segmentation, image recognition, image denoising and the like. The audio processing strategies may include audio noise reduction, echo cancellation, adding tags, adjusting audio parameters and the like.

In embodiments of the present disclosure, the target processing strategy for processing multimedia data may be determined through the evaluation result of the multimedia data, such that the target processing strategy for processing multimedia data may be adjusted in time according to the evaluation result of the multimedia data, such that the multimedia data may be desirably processed, and higher-quality multimedia data may be obtained. Furthermore, by using a smaller data volume to evaluate the multimedia data, the evaluation speed of the multimedia data may be increased, thereby improving processing efficiency of the multimedia data.

In some embodiments, exemplary step 102 of "evaluating the collected multimedia data of the spatial environment where the electronic device is located" may include exemplary step 121a: in response to determining that a blank segment of a preset duration is in the multimedia data, evaluating the multimedia data after the blank segment.

The blank segment may be a segment of the multimedia data that does not contain key data. If the multimedia data in the blank segment is evaluated, the evaluation result may be inaccurate, the target processing strategy may not match, and final processed quality of the multimedia data may be poor because the blank segment does not contain key data. In the case that the multimedia data is audio data, the blank segment may be an audio interval. When the multimedia data is image data, the blank segment may be a segment of image data that no target object (such as a human face and the like) is detected or image parameters change.

In embodiments of the present disclosure, by re-evaluating the multimedia data after each blank segment, the blank segment that do not contain key data may be avoided. The target processing strategy may be continuously updated and adjusted to improve the accuracy of multimedia data evaluation, accurately process the multimedia data, and improve the quality of processed data.

In some embodiments, exemplary step 102 of "evaluating the collected multimedia data of the spatial environment where the electronic device is located" may include exemplary step 121b: in response to determining that the environmental parameter change magnitude of the spatial environment is greater than the first threshold, evaluating the multimedia data.

Different environmental parameters may correspond to different processing strategies. Therefore, after environmental parameters such as the environmental noise, the brightness, and the number of objects in the spatial environment change significantly, the multimedia data may be re-evaluated, and the target processing strategy may be re-determined according to the evaluation result.

In embodiments of the present disclosure, when the environmental parameters of the spatial environment where the electronic device is located change greatly, the multimedia data may be re-evaluated, such that the obtained evaluation result may be more accurate, and determined target processing strategy may desirably meet the need of the multimedia data.

In some embodiments, exemplary step 102 of "evaluating the collected multimedia data of the spatial environment where the electronic device is located" may include exemplary step 121c: in response to collected multimedia data, evaluating the multimedia data. All collected multimedia data may be evaluated.

In embodiments of the present disclosure, by evaluating all collected multimedia data, more comprehensive multimedia data may be obtained, such that the evaluation result may be more accurate.

In some embodiments, exemplary step 102 of "evaluating the collected multimedia data of the spatial environment where the electronic device is located" may include exemplary step 121d: evaluating the multimedia data according to the first interval duration.

In embodiments of the present disclosure, by evaluating the multimedia data according to the first interval duration (time), on the one hand, the evaluation result of the multimedia data may be updated in time; and on the other hand, by evaluating multimedia data at a certain interval duration, consumption of computing resources of the electronic device may be reduced.

In some embodiments, exemplary step 102 of "evaluating the collected multimedia data of the spatial environment where the electronic device is located" may include exemplary step 121e: in response to determining that the attribute information of the multimedia data is changed, evaluating the multimedia data after the change.

Different attribute information of the multimedia data may correspond to different processing strategies. Therefore, when the attribute information of the multimedia data is changed, the multimedia data after the change may be evaluated. The attribute information of the multimedia data may include the type, quantity, form and the like of the multimedia data. For example, the multimedia data may change from the multimedia data generated by the first object to the multimedia data generated jointly by the first object and the second object; or the multimedia data may change from a smaller data volume to a larger data volume; or the multimedia data may change from audio data to video data, or the multimedia data may change from video data to audio data, and the like.

In embodiments of the present disclosure, when the attribute information of the multimedia data is changed, the multimedia data after the change may be evaluated, such that the obtained evaluation result may be more accurate, and furthermore, determined target processing strategy may desirably meet the need of the multimedia data.

In some embodiments, exemplary step 102 of "evaluating the collected multimedia data of the spatial environment where the electronic device is located" may include exemplary step 121f: in response to determining that the operating mode of the electronic device is switched, evaluating the multimedia data collected after the switch.

The operating modes of different electronic devices may correspond to different processing strategies. Therefore, when the operating mode of the electronic device is switched, the multimedia data after the switch may be evaluated. The operating modes of the electronic device may include a conference mode, a video and audio mode, a chat mode, a working mode and the like; and the electronic device may be switched between different operating modes.

In embodiments of the present disclosure, when the operating mode of the multimedia data is switched, the multimedia data after the switch may be evaluated, such that the obtained evaluation result may be more accurate; and furthermore, determined target processing strategy may desirably meet the need of the multimedia data.

In some embodiments, exemplary step 102 of "evaluating the collected multimedia data of the spatial environment where the electronic device is located" may include following exemplary steps 122 and 123.

At exemplary step 122, the processing strategy configured in the electronic device may be used to process the multimedia data to obtain at least two processing results.

The electronic device may be configured with at least two processing strategies; and one processing result may be obtained according to each processing strategy.

At exemplary step 123, the preset evaluation strategy may be used to evaluate each processing result to obtain the evaluation result of each processing strategy.

The processing strategies configured in the electronic device may include configured hardware processing parts and/or processing algorithms. The hardware processing part may include a digital signal processor (DSP), an image signal processor (ISP) or the like. The processing algorithms corresponding to the ISP may include image digitization algorithms, image enhancement and restoration algorithms, image data encoding algorithms, image segmentation algorithms, image recognition algorithms, image denoising algorithms and the like. The processing algorithms corresponding to the DSP may include audio noise reduction algorithms, echo cancellation algorithms, label adding algorithms, and audio parameter adjustment algorithms and the like. The audio noise reduction algorithms may include intelligent noise reduction algorithms (e.g., audio noise separation) and conventional noise reduction algorithms. The conventional noise reduction algorithms may include linear noise reduction algorithms, nonlinear noise reduction algorithms and the like.

Using different processing algorithms in different hardware processing parts to process multimedia data, different processing results of the multimedia data may be obtained. When different processing algorithms in multiple hardware processing parts are used to process the multimedia data, the execution sequence of the processing algorithms may be different, and the processing results obtained may be different.

The electronic device may be pre-configured with the evaluation strategy to evaluate each processing result. The evaluation strategy may include multiple evaluation options such as a signal-to-noise ratio of audio data, a noise sound pressure value, a vocal sound pressure value, an effective signal strength, an image resolution and clarity of image data and the like which may be configured to evaluate the processing result of the processing strategy from multiple different dimensions. The evaluation result may include a score, an evaluation level and/or the like. The higher the signal-to-noise ratio of the audio data is, the stronger the effective signal strength is, and the higher the score or evaluation level of the audio data is. The higher the image resolution and clarity of the image data is, the higher the score or evaluation level of the image data is.

In embodiments of the present disclosure, the processing result may be obtained by using the processing strategy of the electronic device to process the multimedia data, and the evaluation strategy may be used to evaluate the processing result to obtain the evaluation result of the processing strategy. Therefore, the target processing strategy may be determined more accurately according to the evaluation result.

In some embodiments, exemplary step 104 "determining the target processing strategy according to the evaluation result" may include exemplary step 141*a*: determining the target processing strategy according to at least one of a comprehensive score, a specified item score, historical usage information, and historical evaluation information of each processing strategy.

The comprehensive score may be a weighted sum of the evaluation results of the processing strategy using multiple evaluation options of the evaluation strategy. The specified item score may be the evaluation result of the processing strategy using at least one specified evaluation option of the evaluation strategy. The historical usage information may be the number of times, usage frequency and the like that the processing strategy has been used for the multimedia data processing within a historical (e.g., previous) time duration. The historical evaluation information may be a score of the processing strategy within a historical time duration.

In embodiments of the present disclosure, the target processing strategy may be determined through at least one of the comprehensive score, the specified item score, the historical usage information and the historical evaluation information of the processing strategy. Therefore, the target processing strategy consistent with the multimedia data processing need may be determined more accurately.

In some embodiments, exemplary step 104 "determining the target processing strategy according to the evaluation result" may include exemplary step 141*b*: obtaining operating information of the electronic device and determining the target processing strategy according to the operating information and the evaluation result.

The operating information may include operating mode information of the electronic device such as a conference mode, a live broadcast mode, an audio and video mode, a lecture mode, an office mode and the like. The audio processing and/or image processing strategies needed in different operating modes may be different, and needed processing effects may be also different.

The operating information may also include operating application information of the electronic device such as a conference application, a live broadcast application, an instant messaging application, a video application, an audio application and the like. The audio processing and/or image processing strategies needed in different operating applications may be different, and needed processing effects may be also different.

In embodiments of the present disclosure, the target processing strategy may be comprehensively determined by combining the operating information of the electronic device and the evaluation result of the processing strategy, thereby improving accuracy and efficiency of determining the processing strategy for the multimedia data.

In some embodiments, exemplary step 104 "determining the target processing strategy according to the evaluation result" may include exemplary step 141*c*: obtaining source information of the multimedia data and determining the target processing strategy according to the source information and the evaluation result.

The source information may characterize which object or objects the multimedia data is originated from and the like. The objects may be different image sources or different audio sources, and the target processing strategy may be determined by combining the source information and the evaluation information.

In embodiments of the present disclosure, the target processing strategy may be comprehensively determined by combining the source information of the multimedia data and the evaluation result of the processing strategy, thereby improving accuracy and efficiency of determining the processing strategy of the multimedia data. In addition, specific target processing strategy may be determined for the multimedia data from different information sources.

In some embodiments, exemplary step 104 "determining the target processing strategy according to the evaluation result" may include exemplary step 141d: obtaining feedback information from the target user object and determining the target processing strategy according to the feedback information and the evaluation result. The target user object may include at least one of a user object of the electronic device and a user object of a remote device communicatively connected to the electronic device.

The feedback information may be selection information, evaluation information and/or the like of the target user object on the processing strategy. For example, when the user object of the electronic device communicates with the user object of the remote device, the feedback information may be provided by at least one of two target user objects. The selection information may be used to characterize a number, a frequency and the like of the processing strategy being selected by at least one target user object. The evaluation information may be used to characterize the quality of the processing effect outputted by the processing strategy and the like.

In embodiments of the present disclosure, the target processing strategy may be comprehensively determined by combining the feedback information of the target user object and the evaluation result of the processing strategy, thereby further improving accuracy and efficiency of determining the multimedia data processing strategy.

In some embodiments, exemplary step 104 of "using the target processing strategy to process the multimedia data" may include exemplary step 142a or 142b.

At 142a, after sending the multimedia data to the first processing part configured in the electronic device for performing the first processing, the second processing may be performed through the second processing part configured in the electronic device.

At 142b, after sending the multimedia data to the second processing part configured in the electronic device for performing the second processing, the first processing may be performed through the first processing part configured in the electronic device.

The first processing part may be configured with the first processing algorithm capable of performing the first processing, and the second processing part may be configured with the second processing algorithm capable of performing the second processing. The output effects of the first processing and the second processing may be different.

Figure 2:
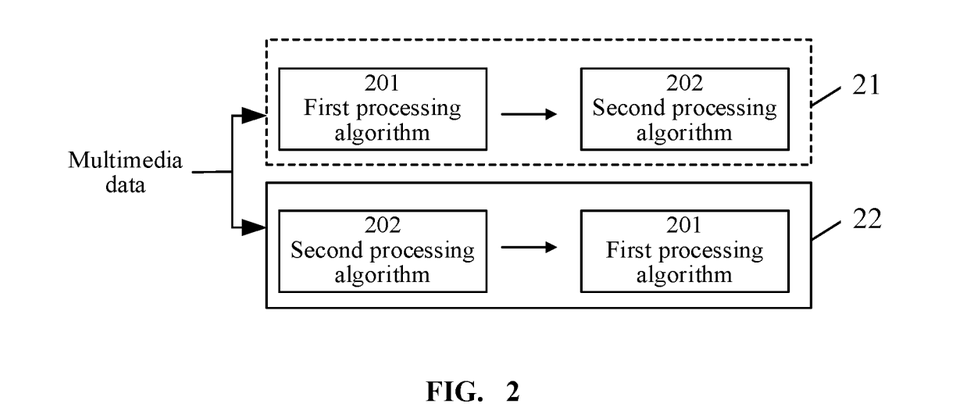
FIG. 2 illustrates a schematic of a processing strategy according to various embodiments of the present disclosure.

As shown in FIG. 2, each processing part may be configured with one processing algorithm. That is, as shown in the execution sequence 21 in FIG. 2, the multimedia data may be sent to the first processing part 201 first, and the first processing algorithm configured by the first processing part 201 may perform the first processing; and after executing the first processing, the multimedia data may be then sent to the second processing part 202, and the second processing algorithm configured by the second processing part 202 may perform the second processing.

As shown in the execution sequence 22 in FIG. 2, the multimedia data may also be sent to the second processing part 202 first, and the second processing algorithm configured by the second processing part 202 may perform the second processing; and after executing the second processing, the multimedia data may be then sent to the first processing part 201, and the first processing algorithm configured by the first processing part 201 may perform the first processing. The processing algorithms may process the multimedia data in different sequences, and processing results may be different; that is, processing results obtained by processing the multimedia data in exemplary steps 142a and 142b may be different.

The first processing part may be the first digital signal processor, which may be denoted as DSP1, and the second processing part may be the second digital signal processor, which may be denoted as DSP2. The first processing algorithm of DSP1 may be the conventional noise reduction algorithm, that is, at least one of the linear noise reduction algorithm and the nonlinear noise reduction algorithm. The second processing algorithm of the DSP2 may be the intelligent noise reduction algorithm, that is, a noise reduction function may be used to perform sound and noise separation to separate the audio signal and noise signal of the first object in the multimedia data.

In embodiments of the present disclosure, the multimedia data may be processed in different sequences through the processing algorithms configured by the processing parts. The execution sequence of the processing algorithms may change according to the change in the environment and the like, such that desirable processing effects may be outputted for different environments. As a result, the multimedia data may be processed more flexibly based on the change in the spatial environment of the electronic device according to the algorithm execution sequence corresponding to the environment, which may achieve desirable processing result.

In some embodiments, exemplary step 104 of "using the target processing strategy to process the multimedia data" may include at least one of exemplary steps 142c to 142e.

At 142c, after sending the multimedia data to the first processing part configured in the electronic device for performing the second processing, the first processing may be performed through the second processing part configured in the electronic device.

At 142d, after sending the multimedia data to the second processing part configured in the electronic device for performing the first processing, the second processing may be performed through the first processing part configured in the electronic device.

At 142e, after sending the multimedia data to the first processing part configured in the electronic device for performing the third processing, the fourth processing may be performed through the second processing part configured in the electronic device.

Each processing part may be configured with multiple processing algorithms. The first processing part may be configured with at least one of the first processing algorithm, the second processing algorithm, and the third processing algorithm. The second processing part may be configured with at least one of the first processing algorithm, the second processing algorithm, and the third processing algorithm. The first processing part and the second processing part may also be configured with the fourth processing algorithm.

Figure 3:
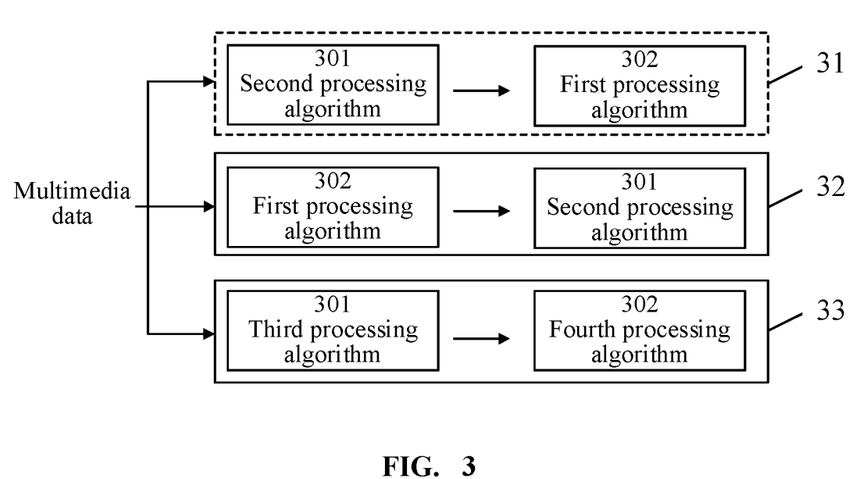
FIG. 3 illustrates another schematic of a processing strategy according to various embodiments of the present disclosure.

As shown in the execution sequence 31 in FIG. 3, the multimedia data may be sent to the first processing part 301 first, and the second processing algorithm configured by the first processing part 301 may execute the second processing; and after executing the second processing, the multimedia data may be then sent to the second processing part 202, and the first processing algorithm configured by the second processing part 202 may execute the first processing.

As shown in the execution sequence 32 in FIG. 3, the multimedia data may be sent to the second processing part 302 first, and the first processing algorithm configured by the second processing part 302 may execute the first processing; and after executing the first processing, the multimedia data may be then sent to the first processing part 301, and the second processing algorithm configured by the first processing part 301 may execute the second processing.

As shown in the execution sequence 33 in FIG. 3, the multimedia data may be sent to the first processing part 301 first, and the third processing algorithm configured by the first processing part 301 may execute the third processing; and after executing the third processing, the multimedia data may be then sent to the second processing part 302, and the fourth processing algorithm configured by the second processing part 302 may execute the fourth processing.

Figure 4:
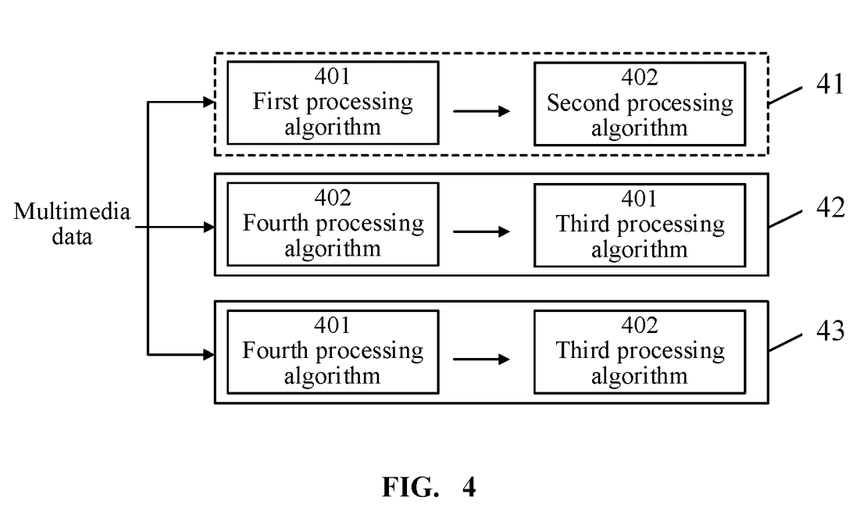
FIG. 4 illustrates another schematic of a processing strategy according to various embodiments of the present disclosure.

In some embodiments, as shown in the execution sequence 41 in FIG. 4, the multimedia data may be sent to the first processing part 401 first, and the first processing algorithm configured by the first processing part 401 may execute the first processing; and after executing the first processing, the multimedia data may be then sent to the second processing part 402, and the second processing algorithm configured by the second processing part 402 may execute the second processing.

As shown in the execution sequence 42 in FIG. 4, the multimedia data may be sent to the second processing part 402 first, and the fourth processing algorithm configured by the second processing part 402 may execute the fourth processing; and after executing the fourth processing, the multimedia data may be then sent to the first processing part 401, and the third processing algorithm configured by the first processing part 401 may execute the third processing.

As shown in the execution sequence 43 in FIG. 4, the multimedia data may be sent to the first processing part 401 first, and the fourth processing algorithm configured by the first processing part 401 may execute the fourth processing; and after executing the fourth processing, the multimedia data may be then sent to the second processing part 402, and the third processing algorithm configured by the second processing part 402 may execute the third processing.

In other embodiments, the electronic device may also include multiple hardware processing parts, and each hardware processing part may be configured with multiple processing algorithms. Different target processing strategies may correspond to different execution sequences of processing algorithms, such that multiple processing parts may be controlled to execute different processing algorithms according to the execution sequences, respectively.

In embodiments of the present disclosure, each processing part may be configured with multiple processing algorithms, and the multimedia data may be processed in different sequences through the processing algorithms configured by the processing parts. The execution sequence of the processing algorithms may change according to the change in the environment and the like, such that desirable processing effects may be outputted for different environments. As a result, the multimedia data may be processed more flexibly based on the change in the spatial environment of the electronic device according to the algorithm execution sequence corresponding to the environment, which may achieve desirable processing result.

In some embodiments, exemplary step 104 of "using the target processing strategy to process the multimedia data" may include at least one of the following exemplary steps 142f and 142g.

At 142f, after sending the first multimedia data in the multimedia data to the first processing part configured in the electronic device for performing the first processing, the second processing may be performed through the second processing part configured in the electronic device; and after sending the second multimedia data in the multimedia data to the second processing part configured in the electronic device for performing the second processing, the first processing part configured in the electronic device may perform the first processing.

At 142g, after sending the first multimedia data in the multimedia data to the second processing part configured in the electronic device for performing the first processing or third processing, the first processing part configured in the electronic device may perform the second processing or the fourth processing; and after sending the second multimedia data in the multimedia data to the first processing part configured in the electronic device for performing the second processing or the fourth processing, the second processing part configured in the electronic device may perform the first processing or the third processing.

The first multimedia data may be generated by the first object, and the second multimedia data may be generated by the second object. The first processing part may be configured with at least one of the first processing algorithm, the second processing algorithm, and the third processing algorithm. The second processing part may be configured with at least one of the first processing algorithm, the second processing algorithm, and the third processing algorithm. The first processing part and the second processing part may also be configured with the fourth processing algorithm.

Figure 5:
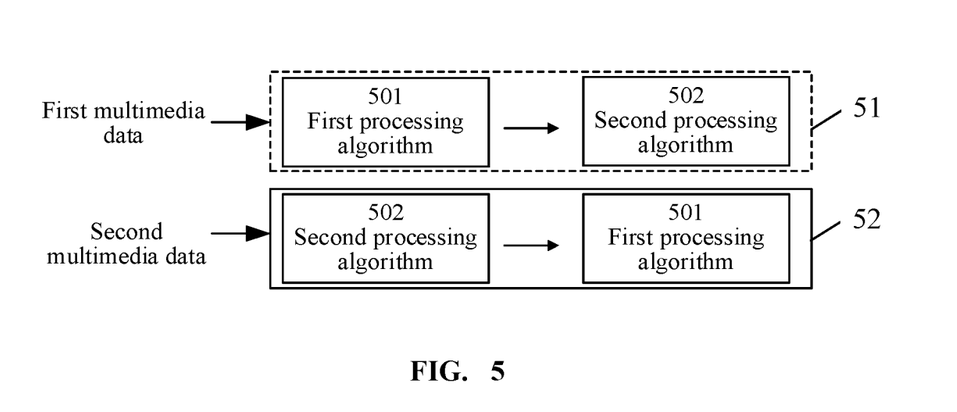
FIG. 5 illustrates another schematic of a processing strategy according to various embodiments of the present disclosure.

Multimedia data generated by different objects may have different processing sequences. As shown in the execution sequence 51 in FIG. 5, after the first process is executed by the first algorithm of the first processing part 501, the second processing may be executed on the first multimedia data generated by the first object through the second processing algorithm of the second processing part 502. As shown in the execution sequence 52 in FIG. 5, after the first process is executed by the second algorithm of the second processing part 502, the first processing may be executed on the second multimedia data generated by the second object through the first algorithm of the first processing part 501.

Figure 6:
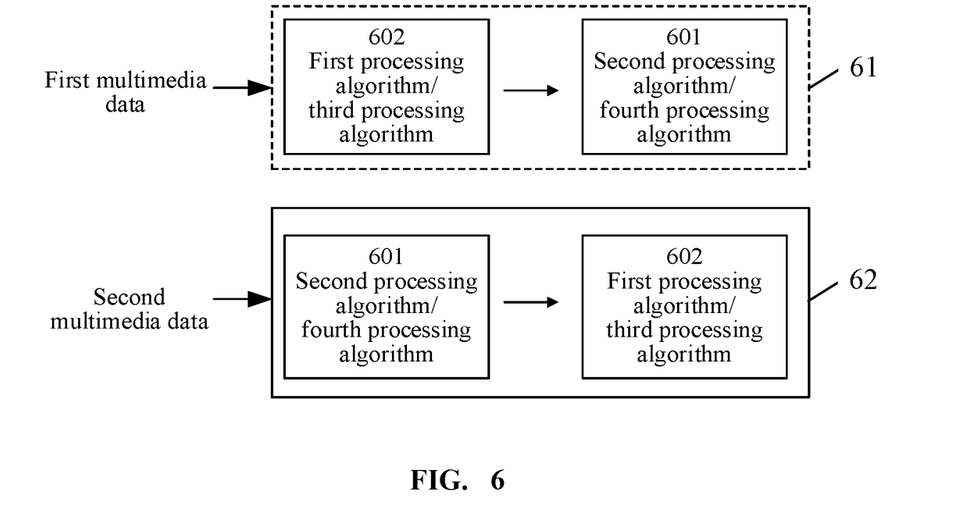
FIG. 6 illustrates another schematic of a processing strategy according to various embodiments of the present disclosure.

As shown in the execution sequence 61 in FIG. 6, after the first multimedia data generated by the first object is first performed with the first processing by the first processing algorithm or the third processing by the third processing algorithm of the second processing part 602, the first multimedia data generated by the first object may be performed with the second processing by the second processing algorithm or the fourth processing by the fourth processing algorithm. As shown in the execution sequence 62 in FIG. 6, after the second multimedia data generated by the second object is first performed with the second processing by the second processing algorithm or the fourth processing by the fourth processing algorithm of the first processing part 601, the second multimedia data generated by the second object may be performed with the first processing by the first processing algorithm or the third processing by the third processing algorithm.

In some embodiments, after the first multimedia data generated by the first object is first performed with the first processing by the first processing algorithm of the first processing part or the third processing by the third processing algorithm, the first multimedia data generated by the first object may be performed with the second processing by the second processing algorithm or the fourth processing by the fourth processing algorithm of the second processing part; and after the second multimedia data generated by the second object is first performed with the second processing by the second processing algorithm of the first processing part or the fourth processing algorithm by the fourth processing part, the second multimedia data generated by the second object may be performed with the first processing by the first processing algorithm or the third processing by the third processing algorithm of the second processing part.

In embodiments of the present disclosure, each processing part may be configured with multiple processing algorithms, and the multimedia data may be processed in different sequences through the processing algorithms configured by the processing parts. The execution sequence of the processing algorithms may change according to the change in the environment and the like, such that desirable processing effects may be outputted for different environments. As a result, the multimedia data may be processed more flexibly based on the change in the spatial environment of the electronic device according to the algorithm execution sequence corresponding to the environment, which may achieve desirable processing result.

In some embodiments, after exemplary step 104 "using the target processing strategy to process the multimedia data", the method may further include at least one of following exemplary steps 106a and 106b.

At 106a, the third processing part configured in the electronic device may be used to perform the fifth processing on the multimedia data processed by the target processing strategy; and the third processing part may be same as or different from the first processing part and the second processing part configured in the electronic device.

At 106b, the fourth processing part configured in the electronic device may be used to encode the multimedia data processed by the target processing strategy, such that, the encoded multimedia data may be sent to a target application; and the target application may run on the electronic device, or a remote device communicatively connected to the electronic device.

The fifth processing may include audio noise reduction, echo cancellation, image enhancement, image recognition, image fusion processing, and other processing. The third processing part may be a digital signal processor or an image signal processor. Compared with the first processing part and the second processing part, the third processing part may be a same hardware processing part and the processing algorithm configured by the hardware processing part may be different; or may be a different hardware processing part. The processing before multimedia data evaluation may be considered as pre-processing, which may be configured to determine the target processing strategy used in the fifth processing of the multimedia data. The fourth processing part may be a codec, for example, a Codec.

Figure 7:
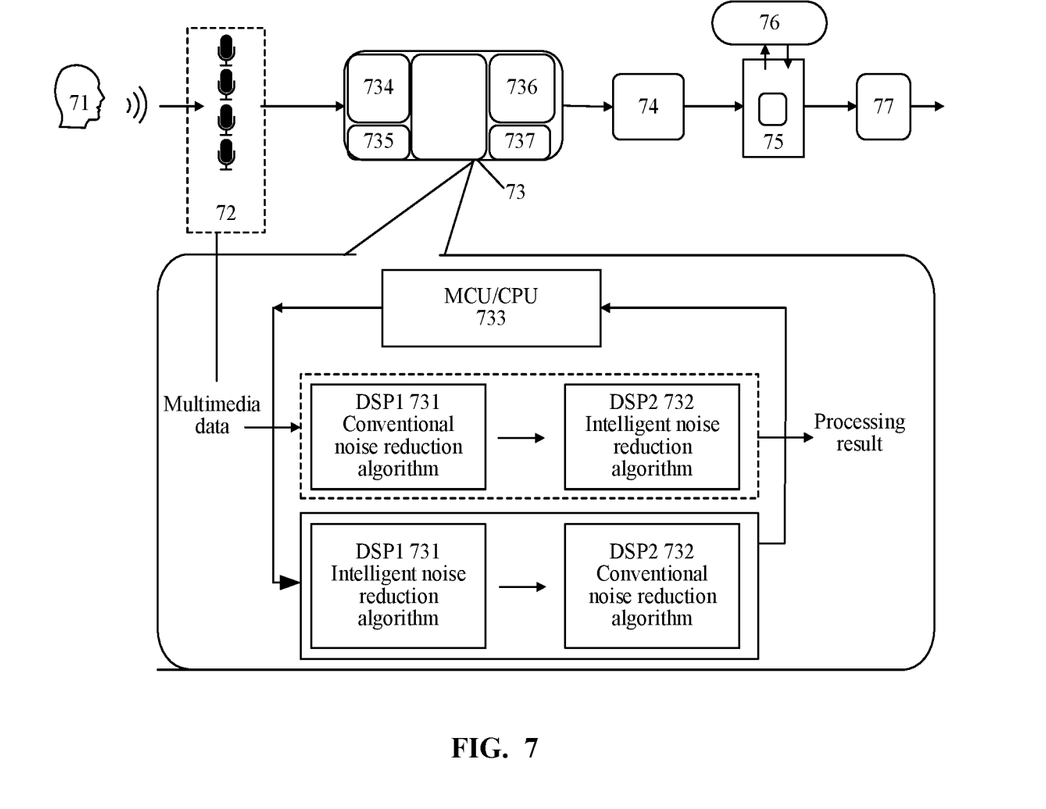
FIG. 7 illustrates another flowchart of a processing method according to various embodiments of the present disclosure.

The electronic device may include a multimedia data collector, a first processor and a second processor. The multimedia data collector may be a dual/stereo digital microphone interface. The first processor may be a central processing unit (CPU)/micro controller unit (MCU). The second processor may be a digital signal processor. As shown in FIG. 7, the electronic device may include a dual/stereo digital microphone interface 72, a processor 73, a fourth processing part 74, a multi-port hub (HUB) 75, a target application 76 and a network single chip 77. The processor 73 may include a first processing part 731, a second processing part 732, a CPU/MCU 733, a microphone interface 734, an audio input part 735, an audio output part 736 and a controller 737. The first processor part 731 and the second processing part 732 may be digital signal processors. The controller 737 may control inter-integrated circuit (I2C), GPIO (general-purpose input/output interface) and LED (light-emitting diode).

The DMIC 72 of the electronic device may obtain the audio data of an object 71 as the multimedia data. The digital signal processor configured in the electronic device may be used to pre-process the multimedia data and obtain the processing result. Two processing strategies may be used to process the multimedia data respectively, and the processing result corresponding to each processing strategy may be obtained.

In one processing strategy, the multimedia data may first be processed by the conventional noise reduction algorithm of DSP1 731, and then processed by the intelligent noise reduction algorithm of DSP2 732 to obtain one processing result. In another processing strategy, the multimedia data may be first processed by the intelligent noise reduction algorithm of DSP1 731, and then processed by the conventional noise reduction algorithm of DSP2 732 to obtain another processing result.

Two processing results may be inputted into the MCU or CPU of the electronic device for evaluation of noise reduction processing. For example, the evaluation result of each processing result may be obtained through the noise sound pressure value and vocal sound pressure value in the processing result; the processing strategy corresponding to the processing results with low noise sound pressure value and high vocal sound pressure value may be determined as the target processing strategy; the multimedia data may be processed according to the target processing strategy; and Codec 74 may be used to encode the multimedia data processed by the target processing strategy, and the encoded multimedia data may be provided to the target application 76. The target application 76 may run on the electronic device or a remote device communicatively connected to the electronic device.

In embodiments of the present disclosure, by encoding the multimedia data processed by the target processing strategy and providing the encoded multimedia data to the target application, desirable quality multimedia data may be provided for the target application; and by providing a real-time evaluation system, conducting real-time analysis of factors in real-time evaluation and switching processing algorithms, noise reduction compatibility of the conventional noise reduction manner and the intelligent noise reduction manner may be achieved through dual digital signal processors.

It should be noted that in embodiments of the present disclosure, if above processing method is implemented in the form of a software function module and sold or used as an independent product, the solution may also be stored in a computer-readable storage medium. According to such understanding, the technical solutions of embodiments of the present disclosure may be embodied in the form of software products in essence or in part that contribute to related technologies. The computer software product may be stored in a storage medium and include a number of instructions to cause the electronic device (which may be a mobile phone, a tablet computer, a desktop computer, a personal digital assistant, a navigator, a digital phone, a video phone, a television, a sensing device or the like) to perform all or part of the methods described in various embodiments of the present disclosure. Above-mentioned storage media may include a U disk, a mobile hard disk, a read only memory (ROM), a magnetic disk or an optical disk and other various media that may store program codes. As a result, embodiments of the present disclosure may not be limited to any specific combination of hardware and software.

Figure 8:
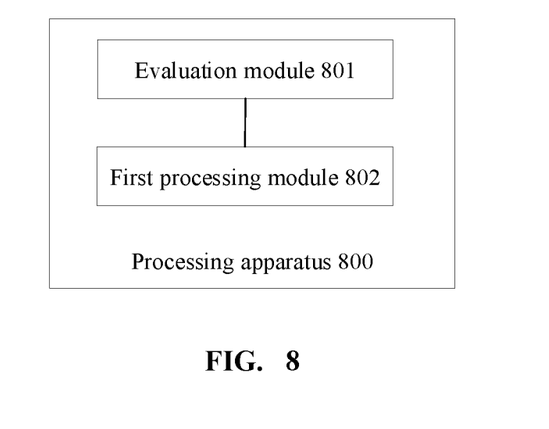
FIG. 8 illustrates a structural schematic of a processing apparatus according to various embodiments of the present disclosure.

FIG. 8 illustrates a structural schematic of a processing apparatus according to various embodiments of the present disclosure. As shown in FIG. 8, a processing apparatus 800 may include an evaluation module 801 and a first processing module 802.

The evaluation module 801 may be configured to evaluate the collected multimedia data of the spatial environment where the electronic device is located.

The first processing module 802 may be configured to determine the target processing strategy according to the evaluation result, where the target processing strategy may be configured to process the multimedia data.

The strategy for evaluating the multimedia data may include the target processing strategy, and the data volume used for evaluation in the multimedia data may be less than the data volume processed under the target processing strategy.

In some embodiments, the evaluation module 801 may include at least one of the following: the first evaluation sub-module, configured to perform evaluation on the multimedia data after the blank segment in response to determining that the blank segment of the preset duration is in the multimedia data; the second evaluation sub-module, configured to evaluate the multimedia data in response to determining that the environmental parameter change magnitude of the spatial environment is greater than the first threshold; the third evaluation sub-module, configured to evaluate the multimedia data in response to the collected multimedia data; the fourth evaluation sub-module, configured to evaluate the multimedia data according to the first interval duration; the fifth evaluation sub-module, configured to evaluate the multimedia data after the change in response to determining that the attribute information of the multimedia data is changed; and the sixth evaluation sub-module, configured to evaluate the collected multimedia data after switch in response to determining that the operating mode of the electronic device is switched.

In some embodiments, the evaluation module 801 may further include the first processing sub-module, configured to process the multimedia data using the processing strategy configured in the electronic device to obtain at least two processing results; and the seventh evaluation sub-module, configured to evaluate each processing result using the preset evaluation strategy to obtain the evaluation result of each processing strategy, where the processing strategy configured in the electronic device may include configured hardware processing parts and/or processing algorithms.

In some embodiments, the first processing module 802 may include at least one of the following: the first determination sub-module, configured to determine the target processing strategy according to at least one of the comprehensive score, the specified item score, the historical usage information, and the historical evaluation information of each processing strategy; the second determination sub-module, configured to obtain the operating information of the electronic device and determine the target processing strategy according to the operating information and the evaluation result; the third determination sub-module, configured to obtain the source information of the multimedia data and determine the target processing strategy according to the source information and the evaluation result; and the fourth determination sub-module, configured to obtain the feedback information from the target user object and determine the target processing strategy according to the feedback information and the evaluation result, where the target user object may include at least one of a user object of the electronic device and a user object of a remote device communicatively connected to the electronic device.

In some embodiments, the first processing module 802 may include at least one of the following: the second processing sub-module, configured to, after sending the multimedia data to the first processing part configured in the electronic device for performing the first processing, perform the second processing through the second processing part configured in the electronic device; and the third processing sub-module, configured to, after sending the multimedia data to the second processing part configured in the electronic device for performing the second processing, perform the first processing through the first processing part configured in the electronic device, where the first processing part may be configured with the first processing algorithm capable of performing the first processing, and the second processing part may be configured with the second processing algorithm capable of performing the second processing.

In some embodiments, the first processing module 802 may include at least one of the following: the fourth processing sub-module, configured to, after sending the multimedia data to the first processing part configured in the electronic device for performing the second processing, perform the first processing through the second processing part configured in the electronic device; the fifth processing sub-module, configured to, after sending the multimedia data to the second processing part configured in the electronic device for performing the first processing, perform the second processing through the first processing part configured in the electronic device; and the sixth processing sub-module, configured to, after sending the multimedia data to the first processing part configured in the electronic device for performing the third processing, perform the fourth processing through the second processing part configured in the electronic device, where the first processing part may be configured with at least one of the first processing algorithm, the second processing algorithm, and the third processing algorithm; and the second processing part may be configured with at least one of the first processing algorithm, the second processing algorithm, and the third processing algorithm.

In some embodiments, the first processing module 802 may include at least one of the following: the seventh processing sub-module, configured to, after sending the first multimedia data in the multimedia data to the first processing part configured in the electronic device for performing the first processing, perform the second processing on the first multimedia data through the second processing part configured in the electronic device, and after sending the second multimedia data in the multimedia data to the second processing part configured in the electronic device for performing the second processing, perform the first processing on the second multimedia data through the first processing part configured in the electronic device; and the eighth processing sub-module, configured to, after sending the first multimedia data in the multimedia data to the second processing part configured in the electronic device for performing the first processing or the third processing, perform the second processing or the fourth processing on the first multimedia data through the first processing part, and after sending the second multimedia data in the multimedia data to the first processing part configured in the electronic device for performing the second processing or the fourth processing, perform the first processing or the third processing on the second multimedia data through the second processing part. The first multimedia data may be generated by the first object, and the second multimedia data may be generated by the second object. The first processing part may be configured with at least one of the first processing algorithm, the second processing algorithm, and the third processing algorithm. The second processing part may be configured with at least one of the first processing algorithm, the second processing algorithm, and the third processing algorithm.

In some embodiments, the apparatus may further include at least one of the following: the second processing submodule, configured to use the third processing part configured in the electronic device to perform the fifth processing on the multimedia data processed by the target processing strategy, where the third processing part may be same as or different from the first processing part and the second processing part configured in the electronic device; and an encoding module, configured to use the fourth processing part configured in the electronic device to encode the multimedia data processed by the target processing strategy and provide the encoded multimedia data to the target application, where the target application may run on the electronic device or a remote device communicatively connected to the electronic device.

Figure 9:
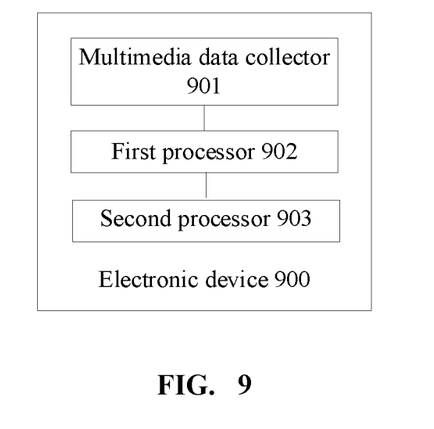
FIG. 9 illustrates a hardware structure of an electronic device according to various embodiments of the present disclosure.

Correspondingly, embodiments of the present disclosure provide an electronic device. FIG. 9 illustrates a hardware (entity) schematic of the electronic device according to various embodiments of the present disclosure. As shown in FIG. 9, the hardware of the electronic device 900 may include a multimedia data collector 901, configured to collect the multimedia data in the spatial environment where the electronic device 900 is located; the first processor 902, connected to the interface of the multimedia data collector 901 and configured to evaluate the multimedia data collected by the multimedia data collector 901 and determine the target processing strategy according to the evaluation result; and the second processor 903, communicatively connected to the first processor 902 and configured to process the multimedia data in response to the target processing strategy.

The strategy used by the first processor 902 to evaluate the multimedia data may include the target processing strategy, and the data volume of the multimedia data processed by the first processor 902 may be less than the data volume of the multimedia data processed by the second processor 903.

Embodiments of the present disclosure provide another electronic device including the first processor, the second processor and a memory. The memory may store a target processing strategy capable of being executed on the second processor; the first processor may be configured to evaluate the collected multimedia data of the spatial environment where the electronic device is located; the first processor may also be configured to determine the target processing strategy according to the evaluation result; and the second processor may be configured to process the multimedia data in response to the target processing strategy. The strategies for evaluating the multimedia data may include the target processing strategy, and the data volume used for evaluation in the multimedia data may be less than the data volume processed under the target processing strategy.

Correspondingly, embodiments of the present disclosure provide a computer-readable storage medium on which a computer program is stored. When the computer program is executed by a processor, exemplary steps in the processing method provided in above-mentioned embodiments may be implemented.

It should be noted herein that above description of the storage medium and device embodiments may be similar to the description of above method embodiments and may have similar beneficial effects as device embodiments. Technical details which are not disclosed in the storage medium and method embodiments of the present disclosure may refer to the description of device embodiments of the present disclosure for understanding.

It should be understood that "one embodiment" or "an embodiment" in the present disclosure may mean that a particular feature, a structure, or a characteristic associated with the embodiment may be included in at least one embodiment of the present disclosure. Therefore, "in one embodiment" or "in an embodiment" in various parts of the present disclosure may not be necessarily referred to same embodiment. Furthermore, particular features, structures or characteristics may be combined in any suitable manner in one or more embodiments. It should be understood that in various embodiments of the present disclosure, the order of the serial numbers of above-mentioned processes may not mean the sequence of execution. The execution sequence of each process should be determined by its functions and internal logic and should not limit the implementation process of embodiments of the present disclosure. Above serial numbers of embodiments of the present disclosure may be only for description and may not indicate the advantages or disadvantages of embodiments.

It should be noted that in the present disclosure, the terms "include", "comprise" or any other variation thereof may be intended to cover a non-exclusive inclusion. Therefore, a process, a method, an article or an apparatus that includes a list of elements may include not only those elements, but also include other elements not expressly listed or elements which are inherent to the process, the method, the article or the apparatus. Without further limitation, an element defined by the statement "comprises a . . . " may not exclude the presence of additional identical elements in a process, a method, an article or an apparatus that includes such element.

In some embodiments provided in the present disclosure, it should be understood that disclosed devices and methods may be implemented in other manners. The device embodiments described above may be merely illustrative. For example, the division of units may be only a logical function division, and there may be other division manners in actual implementation. For example, multiple units or parts may be combined or integrated into another system, or some features may be ignored or not implemented. In addition, the coupling, direct coupling, or communication connection between the parts shown or discussed may be indirect coupling or communication connection through certain interfaces, devices or units, and may be electrical, mechanical or other forms.

The units described above as separate parts may or may not be physically separated; the parts shown as units may or may not be physical units, which may be located in one place or distributed to multiple network units; and some or all of the units may be selected according to actual needs to achieve the purpose of the solutions of embodiments. In addition, each functional unit in each embodiment of the present disclosure may be all integrated into one processing unit; or each unit may be separately used as one unit; or two or more units may be integrated into one unit. Above integrated unit may be implemented in the form of hardware or in the form of hardware plus software functional units.

Those skilled in the art should understand that all or part of exemplary steps to implement above method embodiments may be completed by hardware related to program instructions; and above-mentioned program may be stored in a computer-readable storage medium. When the program is executed, exemplary steps of above method embodiments may be executed. Above-mentioned storage media may include mobile storage devices, read-only memory (ROM), magnetic disks or optical disks, and other media that may store program codes. Optionally, if the integrated units mentioned above in the present disclosure are implemented in the form of software function modules and sold or used as independent products, the integrated units may also be stored in a computer-readable storage medium. Based on such understanding, the technical solutions of embodiments of the present disclosure may be embodied in the form of software products in essence or in part that contribute to related technologies. The computer software product may be stored in a storage medium and include a number of instructions to cause the computer device (which may be a mobile phone, a tablet computer, a desktop computer, a personal digital assistant, a navigator, a digital phone, a video phone, a television, a sensing device or the like) to perform all or part of the methods described in various embodiments of the present disclosure. Above-mentioned storage media may include mobile storage devices, ROMs, magnetic disks or optical disks, and other media that may store program codes.

The methods disclosed in some method embodiments provided in the present disclosure may be combined arbitrarily to obtain new method embodiments without conflict. The features disclosed in some product embodiments provided in the present disclosure may be combined arbitrarily without conflict to obtain new product embodiments. The features disclosed in some methods or device embodiments provided in the present disclosure may be combined arbitrarily without conflict to obtain new method embodiments or device embodiments.

Compared with the existing technology, the technical solutions provided by the present disclosure may achieve at least the following beneficial effects.

In embodiments of the present disclosure, the target processing strategy for processing multimedia data may be determined through the evaluation result of the multimedia data, such that the target processing strategy for processing multimedia data may be adjusted in time according to the evaluation result of the multimedia data, such that the multimedia data may be desirably processed, and higher-quality multimedia data may be obtained. Furthermore, by using a smaller data volume to evaluate the multimedia data, the evaluation speed of the multimedia data may be increased, thereby improving processing efficiency of the multimedia data.

The above may be only embodiments of the present disclosure, but the protection scope of the present disclosure may not be limited thereto. Those skilled in the art may easily think of changes or substitutions within the technical scope disclosed in the present disclosure, which should be covered by the protection scope of the present disclosure. Therefore, the protection scope of the present disclosure should be subject to the protection scope of the claims.

What is claimed is:

1. A processing method, comprising:
    evaluating multimedia data of a spatial environment where an electronic device is located to obtain an evaluation result;
    determining a target processing strategy according to the evaluation result; and
    using the target processing strategy to process the multimedia data, wherein:
        strategies for evaluating the multimedia data include the target processing strategy; and
        a first data volume of the multimedia data used for evaluating the multimedia data is less than a second data volume of the multimedia data processed under the target processing strategy.

2. The method according to claim 1, wherein evaluating the multimedia data of the spatial environment where the electronic device is located includes at least one of:
    in response to determining that a blank segment of a preset duration is in the multimedia data, evaluating the multimedia data after the blank segment;
    in response to determining that an environmental parameter change magnitude of the spatial environment is greater than a first threshold, evaluating the multimedia data;
    in response to the multimedia data, evaluating the multimedia data;
    evaluating the multimedia data according to a first interval duration;
    in response to determining that attribute information of the multimedia data is changed, evaluating the multimedia data after change; and
    in response to determining that an operating mode of the electronic device is switched, evaluating the multimedia data after switch.

3. The method according to claim 1, wherein determining the target processing strategy according to the evaluation result includes at least one of:
    determining the target processing strategy according to at least one of a comprehensive score, a specified item score, historical usage information, and historical evaluation information of each processing strategy;
    obtaining operating information of the electronic device and determining the target processing strategy according to the operating information and the evaluation result;
    obtaining source information of the multimedia data and determining the target processing strategy according to the source information and the evaluation result; and
    obtaining feedback information from a target user object and determining the target processing strategy according to the feedback information and the evaluation result, wherein the target user object includes at least one of a user object of the electronic device and a user object of a remote device communicatively connected to the electronic device.

4. The method according to claim 1, wherein using the target processing strategy to process the multimedia data includes at least one of:
    after sending the multimedia data to a first processing part configured in the electronic device for performing a first processing, performing a second processing through a second processing part configured in the electronic device; and
    after sending the multimedia data to the second processing part configured in the electronic device for performing the second processing, performing the first processing through the first processing part configured in the electronic device, wherein the first processing part is configured with a first processing algorithm capable of performing the first processing, and the second processing part is configured with a second processing algorithm capable of performing the second processing.

5. The method according to claim 4, wherein using the target processing strategy to process the multimedia data includes at least one of:
   using a third processing part configured in the electronic device to perform a fifth processing on the multimedia data processed by the target processing strategy, wherein the third processing part is same as or different from the first processing part and the second processing part which are configured in the electronic device; and
   using a fourth processing part configured in the electronic device to encode the multimedia data processed by the target processing strategy to provide encoded multimedia data to a target application, wherein the target application runs on the electronic device, or a remote device communicatively connected to the electronic device.

6. The method according to claim 1, wherein using the target processing strategy to process the multimedia data includes at least one of:
   after sending the multimedia data to a first processing part configured in the electronic device for performing a second processing, performing a first processing through a second processing part configured in the electronic device;
   after sending the multimedia data to the second processing part configured in the electronic device for performing the first processing, performing the second processing through the first processing part configured in the electronic device; and
   after sending the multimedia data to the first processing part configured in the electronic device for performing a third processing, performing a fourth processing through the second processing part configured in the electronic device, wherein the first processing part is configured with at least one of a first processing algorithm, a second processing algorithm, and a third processing algorithm; and the second processing part is configured with at least one of the first processing algorithm, the second processing algorithm, and the third processing algorithm.

7. The method according to claim 1, wherein using the target processing strategy to process the multimedia data includes at least one of:
   after sending first multimedia data in the multimedia data to a first processing part configured in the electronic device for performing a first processing, performing a second processing through a second processing part configured in the electronic device; after sending second multimedia data in the multimedia data to the second processing part configured in the electronic device for performing the second processing, performing the first processing through the first processing part configured in the electronic device; and
   after sending the first multimedia data in the multimedia data to the second processing part configured in the electronic device for performing the first processing or a third processing, performing the second processing or a fourth processing through the first processing part configured in the electronic device; after sending the second multimedia data in the multimedia data to the first processing part configured in the electronic device for performing the second processing or the fourth processing, performing the first processing or the third processing through the second processing part configured in the electronic device, wherein the first multimedia data is generated by a first object, and the second multimedia data is generated by a second object; the first processing part is configured with at least one of a first processing algorithm, a second processing algorithm, and a third processing algorithm; and the second processing part is configured with at least one of the first processing algorithm, the second processing algorithm, and the third processing algorithm.

8. The method according to claim 1, wherein the evaluation result comprises one or more of a signal-to-noise ratio of the multimedia data, a strength of an effective signal of the multimedia data, and an amount of noise in the multimedia data.

9. An electronic device, comprising:
   a multimedia data collector, configured to collect multimedia data in a spatial environment where the electronic device is located;
   a first processor, connected to an interface of the multimedia data collector and configured to evaluate the multimedia data collected by the multimedia data collector to obtain an evaluation result and determine a target processing strategy according to the evaluation result; and
   a second processor, communicatively connected to the first processor and configured to process the multimedia data in response to the target processing strategy, wherein:
      strategies for evaluating the multimedia data by the first processor includes the target processing strategy, and
      a first data volume of the multimedia data processed by the first processor for evaluating the multimedia data is less than a second data volume of the multimedia data processed by the second processor under the target processing strategy.

10. The electronic device according to claim 9, wherein the first processor is further configured to perform at least one of:
   in response to determining that a blank segment of a preset duration is in the multimedia data, evaluating the multimedia data after the blank segment;
   in response to determining that an environmental parameter change magnitude of the spatial environment is greater than a first threshold, evaluating the multimedia data;
   in response to the multimedia data, evaluating the multimedia data;
   evaluating the multimedia data according to a first interval duration;
   in response to determining that attribute information of the multimedia data is changed, evaluating the multimedia data after change; and
   in response to determining that an operating mode of the electronic device is switched, evaluating the multimedia data after switch.

11. The electronic device according to claim 9, wherein the first processor is further configured to perform at least one of:
   determining the target processing strategy according to at least one of a comprehensive score, a specified item score, historical usage information, and historical evaluation information of each processing strategy;
   obtaining operating information of the electronic device and determining the target processing strategy according to the operating information and the evaluation result;

obtaining source information of the multimedia data and determining the target processing strategy according to the source information and the evaluation result; and obtaining feedback information from a target user object and determining the target processing strategy according to the feedback information and the evaluation result, wherein the target user object includes at least one of a user object of the electronic device and a user object of a remote device communicatively connected to the electronic device.

12. The electronic device according to claim 9, wherein the evaluation result comprises one or more of a signal-to-noise ratio of the multimedia data, a strength of an effective signal of the multimedia data, and an amount of noise in the multimedia data.

13. A non-transitory computer-readable storage medium, containing a computer program for, when executed by a processor, performing a processing method, the method comprising:

evaluating multimedia data of a spatial environment where an electronic device is located to obtain an evaluation result;

determining a target processing strategy according to the evaluation result; and using the target processing strategy to process the multimedia data, wherein:

strategies for evaluating the multimedia data include the target processing strategy; and a first data volume of the multimedia data used for evaluating the multimedia data is less than a second data volume of the multimedia data processed under the target processing strategy.

14. The storage medium according to claim 13, wherein evaluating the multimedia data of the spatial environment where the electronic device is located includes at least one of:

in response to determining that a blank segment of a preset duration is in the multimedia data, evaluating the multimedia data after the blank segment;

in response to determining that an environmental parameter change magnitude of the spatial environment is greater than a first threshold, evaluating the multimedia data;

in response to the multimedia data, evaluating the multimedia data;

evaluating the multimedia data according to a first interval duration;

in response to determining that attribute information of the multimedia data is changed, evaluating the multimedia data after change; and in response to determining that an operating mode of the electronic device is switched, evaluating the multimedia data after switch.

15. The storage medium according to claim 13, wherein evaluating the multimedia data of the spatial environment where the electronic device is located includes:

using a processing strategy configured in the electronic device to process the multimedia data to obtain at least two processing results; and using a preset evaluation strategy to evaluate each processing result to obtain an evaluation result of each processing strategy, wherein the processing strategy configured in the electronic device includes a configured hardware processing part and/or a configured processing algorithm.

16. The storage medium according to claim 13, wherein determining the target processing strategy according to the evaluation result includes at least one of:

determining the target processing strategy according to at least one of a comprehensive score, a specified item score, historical usage information, and historical evaluation information of each processing strategy;

obtaining operating information of the electronic device and determining the target processing strategy according to the operating information and the evaluation result;

obtaining source information of the multimedia data and determining the target processing strategy according to the source information and the evaluation result; and obtaining feedback information from a target user object and determining the target processing strategy according to the feedback information and the evaluation result, wherein the target user object includes at least one of a user object of the electronic device and a user object of a remote device communicatively connected to the electronic device.

17. The storage medium according to claim 13, wherein using the target processing strategy to process the multimedia data includes at least one of:

after sending the multimedia data to a first processing part configured in the electronic device for performing a first processing, performing a second processing through a second processing part configured in the electronic device; and after sending the multimedia data to the second processing part configured in the electronic device for performing the second processing, performing the first processing through the first processing part configured in the electronic device, wherein the first processing part is configured with a first processing algorithm capable of performing the first processing, and the second processing part is configured with a second processing algorithm capable of performing the second processing.

18. The storage medium according to claim 17, wherein using the target processing strategy to process the multimedia data includes at least one of:

using a third processing part configured in the electronic device to perform a fifth processing on the multimedia data processed by the target processing strategy, wherein the third processing part is same as or different from the first processing part and the second processing part which are configured in the electronic device; and using a fourth processing part configured in the electronic device to encode the multimedia data processed by the target processing strategy to provide encoded multimedia data to a target application, wherein the target application runs on the electronic device, or a remote device communicatively connected to the electronic device.

19. The storage medium according to claim 13, wherein using the target processing strategy to process the multimedia data includes at least one of:

after sending the multimedia data to a first processing part configured in the electronic device for performing a second processing, performing a first processing through a second processing part configured in the electronic device;

after sending the multimedia data to the second processing part configured in the electronic device for performing the first processing, performing the second processing through the first processing part configured in the electronic device; and after sending the multimedia data to the first processing part configured in the electronic device for performing a third processing, performing a fourth processing through the second processing part configured in the electronic device, wherein the first processing part is configured with at least one of a first processing algorithm, a second processing algorithm, and a third processing algorithm; and the second processing part is configured with at least one of the first processing algorithm, the second processing algorithm, and the third processing algorithm.

20. The storage medium according to claim 13, wherein using the target processing strategy to process the multimedia data includes at least one of:

after sending first multimedia data in the multimedia data to a first processing part configured in the electronic device for performing a first processing, performing a second processing through a second processing part configured in the electronic device; after sending second multimedia data in the multimedia data to the second processing part configured in the electronic device for performing the second processing, performing the first processing through the first processing part configured in the electronic device; and after sending the first multimedia data in the multimedia data to the second processing part configured in the electronic device for performing the first processing or a third processing, performing the second processing or a fourth processing through the first processing part configured in the electronic device; after sending the second multimedia data in the multimedia data to the first processing part configured in the electronic device for performing the second processing or the fourth processing, performing the first processing or the third processing through the second processing part configured in the electronic device, wherein the first multimedia data is generated by a first object, and the second multimedia data is generated by a second object; the first processing part is configured with at least one of a first processing algorithm, a second processing algorithm, and a third processing algorithm; and the second processing part is configured with at least one of the first processing algorithm, the second processing algorithm, and the third processing algorithm.

* * * * *